United States Patent
Verbeke et al.

(10) Patent No.: US 10,227,439 B2
(45) Date of Patent: Mar. 12, 2019

(54) ALDEHYDE COMPRISING COMPOUNDS SUITABLE FOR MAKING CURABLE POLYISOCYANATE COMPOSITIONS

(71) Applicants: HUNTSMAN INTERNATIONAL LLC, Salt Lake City, UT (US); HUNTSMAN (EUROPE) BVBA, Everberg (BE)

(72) Inventors: Hugo Verbeke, Wilsele (BE); Hans Godelieve Guido Verbeke, Lubbeek (BE); Christian Esbelin, Schaerbeek (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

(21) Appl. No.: 14/890,639

(22) PCT Filed: May 9, 2014

(86) PCT No.: PCT/EP2014/059527
§ 371 (c)(1),
(2) Date: Nov. 12, 2015

(87) PCT Pub. No.: WO2014/187683
PCT Pub. Date: Nov. 27, 2014

(65) Prior Publication Data
US 2017/0081461 A1    Mar. 23, 2017

(30) Foreign Application Priority Data
May 24, 2013 (EP) .................................. 13169074

(51) Int. Cl.
| | | |
|---|---|---|
| C08G 18/70 | (2006.01) | |
| C08G 18/09 | (2006.01) | |
| C08G 18/48 | (2006.01) | |
| C08G 18/76 | (2006.01) | |
| C08G 18/78 | (2006.01) | |
| C08G 18/79 | (2006.01) | |
| C08G 18/22 | (2006.01) | |

(52) U.S. Cl.
CPC ......... *C08G 18/092* (2013.01); *C08G 18/225* (2013.01); *C08G 18/48* (2013.01); *C08G 18/4845* (2013.01); *C08G 18/7671* (2013.01); *C08G 18/7818* (2013.01); *C08G 18/791* (2013.01); *C08G 18/794* (2013.01); *C08G 18/797* (2013.01)

(58) Field of Classification Search
CPC .... C08G 18/092; C08G 18/225; C08G 18/48; C08G 18/4845; C08G 18/7671; C08G 18/7818; C08G 18/791; C08G 18/794; C08G 18/797; C08G 18/006
See application file for complete search history.

(56) References Cited

U.S. PATENT DOCUMENTS

| | | | | |
|---|---|---|---|---|
| 3,179,626 A | * | 4/1965 | Beitchman | C08G 18/022 521/113 |
| 3,609,149 A | * | 9/1971 | Matsui | C07D 251/34 528/48 |
| 4,055,522 A | * | 10/1977 | Ashida | C08G 18/006 521/113 |
| 5,144,074 A | | 9/1992 | Listemann et al. | |
| 5,650,537 A | | 7/1997 | Beller et al. | |
| 2003/0216517 A1 | | 11/2003 | Mayo et al. | |

FOREIGN PATENT DOCUMENTS

| | | | | |
|---|---|---|---|---|
| EP | 0 659 791 | | 6/1995 | |
| WO | 2006/097594 | | 9/2006 | |
| WO | 2008/060454 | | 5/2008 | |
| WO | 2010/121898 | | 10/2010 | |
| WO | 2012/103965 | | 8/2012 | |
| WO | WO 2012103965 | * | 9/2012 | ............. C08G 18/00 |
| WO | WO 2013098034 A1 | * | 7/2013 | ......... C08G 18/6685 |
| WO | WO 2013143841 A1 | * | 10/2013 | .......... B01J 31/0201 |

OTHER PUBLICATIONS

G. Woods; The ICI Polyurethanes Book; 2nd edition; p. 32-35; 1990.

* cited by examiner

*Primary Examiner* — Michael L Leonard
(74) *Attorney, Agent, or Firm* — Huntsman International LLC; Robert Diaz (57) ABSTRACT

A curable polyisocyanate composition comprising at least one or more polyisocyanate compounds, at least one or more trimerization catalyst compounds, at least one or more aldehyde compounds wherein the aldehyde compound is selected from compounds with the structure R—CHO wherein CHO is an aldehyde group and R is a hydrocarbyl group selected from an alkyl, alkenyl or aryl having 1-50 carbon atoms, preferably 1-20 carbon atoms, and at least one or more compounds selected from compounds which comprise a carboxamide group having the structure —CO—NH$_2$ and/or from compounds which comprise a group having the structure —CO—NH—CO—.

6 Claims, 4 Drawing Sheets

ALDEHYDE COMPRISING COMPOUNDS SUITABLE FOR MAKING CURABLE POLYISOCYANATE COMPOSITIONS

This application is the National Phase of International Application PCT/EP2014/059527 filed May 9, 2014 which designated the U.S. and which claims priority to Foreign Application No. 13169074.5 filed May 24, 2013. The noted applications are incorporated herein by reference.

FIELD OF INVENTION

The present invention is related to aldehyde compounds suitable for making curable polyisocyanate compositions.

Further the present invention is related to a process for preparing said curable composition.

Still further the present invention is concerned with a process to prepare a polyisocyanurate comprising material by allowing the curable composition to react and to a polyisocyanurate comprising material made by allowing such curable composition to react.

Recently a curable composition has been proposed which comprises a polyisocyanate, a lithium halide, a urea compound and an epoxy resin; see PCT/EP2010/054492.

PCT/EP2011/069562 discloses curable compositions obtained by combining and mixing an epoxy resin composition comprising an epoxy resin, a monool and/or polyol and a compound comprising a carboxamide group, and a polyisocyanate composition comprising a polyisocyanate, a lithium halide and a urea compound.

Surprisingly we have found that the curing temperature required to let the curable composition of the state of the art (PCT/EP2011/069562) react in order to make polyisocyanurate comprising materials could be significantly lowered when making use of a curable aldehyde comprising composition instead of a curable epoxy comprising resin composition.

It was further found that the pot-life of the curable composition according to the invention is comparable to a state of the art curable composition based on an epoxy comprising resin composition.

Therefore, the present invention relates to a polyisocyanate composition comprising aldehyde compounds suitable for making a curable polyisocyanate composition.

The present invention hence relates to a curable polyisocyanate comprising composition and a process for making said curable composition. Said curable composition comprising:
- one or more polyisocyanate compounds, and
- one or more aldehyde compounds, and
- one or more compounds which comprises a carboxamide group having the structure —CO—NH$_2$ and/or compounds which comprise a group having the structure —CO—NH—CO—, and
- one or more trimerization catalyst compound, and
- optionally a solvent, which has no isocyanate-reactive groups, and/or a monool and/or a polyol wherein the number of carboxamide equivalents per aldehyde equivalent is 0.0005-1 and preferably 0.005-0.7 and most preferably 0.01-0.5.

Still further the present invention is concerned with a process to prepare a polyisocyanurate material by allowing the above defined curable composition to react at elevated temperature and with the polyisocyanurate material prepared in this way.

SUMMARY OF THE INVENTION

According to a first aspect, a curable polyisocyanate composition is disclosed, said composition comprising:
- at least one or more polyisocyanate compounds,
- at least one or more trimerization catalyst compounds,
- at least one or more aldehyde compounds wherein the aldehyde compound is selected from compounds with the structure R—CHO wherein CHO is an aldehyde group and R is a hydrocarbyl group selected from an alkyl, alkenyl or aryl having 1-50 carbon atoms, preferably 1-20 carbon atoms, and
- at least one or more compounds selected from compounds which comprise a carboxamide group having the structure —CO—NH$_2$ and/or from compounds which comprise a group having the structure —CO—NH—CO—
- wherein the number of equivalents of compounds which comprise a carboxamide group having the structure —CO—NH$_2$ and/or from compounds which comprise a group having the structure —CO—NH—CO— is smaller or equal than the number of aldehyde equivalents and
- wherein the number of equivalents of compounds which comprise a carboxamide group and/or from compounds which comprise a group having the structure —CO—NH—CO— is at least 0.75 times the number of trimerization catalyst equivalents.

According to embodiments, the number of equivalents of compounds which comprises a carboxamide group and/or compounds which comprise a group having the structure —CO—NH—CO— per aldehyde equivalent is 0.0005-1 and preferably 0.005-0.7 and most preferably 0.01-0.5.

According to embodiments the aldehyde compounds are selected from compounds with the structure R—CHO wherein CHO is an aldehyde functional group and R is a hydrocarbyl group selected from an alkyl, alkenyl or aryl having 1-50 carbon atoms, preferably 1-20 carbon atoms.

According to embodiments, the hydrocarbyl group R in the aldehyde compound is a combination of linear, branched, saturated, unsaturated, cyclic and/or non-cyclic aliphatic, aromatic or araliphatic hydrocarbyls and/or comprises 1 or more unsaturations and/or optionally 1 or more aromatic rings and/or optionally further comprises heteroatoms preferably selected from oxygen, halogens, nitrogen and/or optionally comprises one or more functional group comprising heteroatoms preferably selected from an hydroxy, halogen, carboxyl, ester, ether, aldehyde and/or amine group and combination of such groups.

According to an embodiment, the compound comprising a group having the structure —CO—NH—CO— may be a compound having the structure R$_1$—CO—NH—CO—R$_2$ wherein R$_1$ and R$_2$ each independently from each other are selected from 1) hydrogen (—H), 2) —NR$_3$R$_4$, 3) hydrocarbyl having 1-100 carbon atoms and optionally comprising hydroxy, ether, halogen, carboxyl, oxygen, isocyanate and/or amine groups wherein R$_3$ and R$_4$ independently from each other, are selected from hydrogen, hydroxy, halogen and hydrocarbyl groups which hydrocarbyl groups have 1-20 carbon atoms and optionally comprise hydroxy, ether, halogen, carboxyl, isocyanate and/or amine groups, wherein $R_1$ and $R_2$ may be linked to each other essentially forming a ring structure including the —CO—NH—CO— group, and wherein the hydrocarbyl groups in the compounds corresponding to the formula $R_1$—CO—NH—CO—$R_2$ may be a combination of linear, branched, saturated, unsaturated, cyclic and/or non-cyclic aliphatic, aromatic or araliphatic hydrocarbyls and mixtures of such compounds.

According to an embodiment, the compound comprising a group having the structure —CO—NH—CO— may be a compound having the structure $R_1$—CO—NH—CO—$R_2$ wherein $R_1$ and $R_2$ together with the —CO—NH—CO— group form a 4 to 12 membered ring structure including the —CO—NH—CO— group.

According to an embodiment, the compound comprising a group having the structure —CO—NH—CO— may be a compound comprising a —CO—NH—CO— NH— group and may be a reaction product of a compound comprising a carboxamide group having the structure —CO—NH2 and a polyisocyanate compound comprising a reactive NCO group. Said compound may correspond to R6-CO—NH—CO— NH—R7 wherein the compound comprising a carboxamide group may corresponds to NH2-CO—R6 wherein R6 is 1) hydrogen (—H), 2) —NR8R9, 3) hydrocarbyl having preferably 1-20 carbon atoms and more preferably 1-10 carbon atoms which optionally further comprises 1-3 hydroxy and/or ether groups, halogen and/or amine groups, 4) phenyl or 5) tolyl or 6) —R10-CO—NH2, wherein R8 and R9, independently from each other, are selected from hydrogen, hydroxy, halogen and hydrocarbyl groups which hydrocarbyl groups preferably have 1-10 carbon atoms and more preferably 1-6 carbon atoms and optionally comprise hydroxy, ether, halogen and/or amine groups and wherein R10 is a bivalent hydrocarbon radical having up to 8 carbon atoms and mixtures of these carboxamides, and wherein the compound comprising a reactive NCO group corresponds to R7-NCO and wherein R7 is selected from hydrogen and hydrocarbyl groups which hydrocarbyl groups have 1-20 carbon atoms and optionally comprise hydroxy, ether, halogen, carboxyl, isocyanate and/or amine groups and wherein said hydrocarbyl groups may be a combination of linear, branched, saturated, unsaturated, cyclic and/or non-cyclic aliphatic, aromatic or araliphatic hydrocarbyls and mixtures of such compounds.

According to an embodiment, the polyisocyanate compounds in the polyisocyanate composition are selected from a toluene diisocyanate, a methylene diphenyl diisocyanate or a polyisocyanate composition comprising a methylene diphenyl diisocyanate or a mixture of such polyisocyanates.

According to some embodiments of the present invention, the polyisocyanate composition may further comprise a solvent which has no isocyanate-reactive groups, and/or a monool and/or a polyol solvent and/or monool/polyol composition on top of the above cited compounds.

Preferably said polyol/monool composition comprises polyester and/or polyether polyols having an average molecular weight of preferably 32-6000 and an average nominal functionality of preferably 1-8.

According to an embodiment, the trimerization catalyst compound is selected from one or more organic salts, preferably said organic salt is selected from alkali metal, earth alkali metal and/or quaternary ammonium organic salts, more preferably from carboxylates and/or alkoxides such as potassium acetate, potassium hexanoate, potassium ethylhexanoate, potassium octanoate, potassium lactate, sodium ethoxide, sodium formate, potassium formate, sodium acetate, potassium benzoate and mixtures thereof.

According to an embodiment, the trimerization catalyst compound is selected from a composition containing a lithium halide (preferably LiCl) and an epoxy resin provided that the number of Li-halide equivalents over the number of epoxy equivalents is in the range 1:2 to 1:80, more preferably in the range 1:2 to 1:40, and even more preferably 1:4 to 1:30. Optionally the catalyst composition is further comprising an urea compound (preferably prepared by reacting a polyisocyanates with an amine compound).

According to a second aspect a process for making the curable polyisocyanate composition according to the first aspect of the invention is disclosed. Said process may comprise at least the steps of:

combining and mixing one or more aldehyde compounds, one or more polyisocyanates and one or more compounds selected from compounds which comprise a carboxamide group having the structure —CO—$NH_2$ and/or from compounds which comprise a group having the structure —CO—NH—CO—, and then or at least simultaneously Combining and mixing one or more trimerization catalyst compounds optionally dissolved in a solvent, which has no isocyanate-reactive groups and/or a polyol/monool composition which preferably comprises polyester and/or polyether polyols having an average molecular weight of preferably 32-6000 and an average nominal functionality of preferably 1-8.

Wherein the number of equivalents of compounds having a —CO—NH—CO— group in the curable polyisocyanate composition is smaller or equal than the number of aldehyde equivalents and wherein the number of equivalents of compounds which comprise a carboxamide group having the structure —CO—$NH_2$ and/or a compounds which comprise a group having the structure —CO—NH—CO added to a polyisocyanate composition is at least 0.75 times the number of trimerization catalyst equivalents added to a polyisocyanate composition.

According to embodiments, the number of equivalents of compounds comprising a carboxamide group having the structure —CO—$NH_2$ and/or from compounds which comprise a group having the structure —CO—NH—CO— added is at least greater than the number of catalyst compound equivalents and the final concentration of the compound comprising a —CO—NH—CO— group in the curable polyisocyanate composition is such that the ratio of —CO—NH—CO— groups over the number of isocyanate groups is at most 1, preferably at most 0.01, more preferably at most 0.005.

According to embodiments, the initial number of equivalents of compounds comprising a carboxamide group having the structure —CO—$NH_2$ and/or from compounds which comprise a group having the structure —CO—NH—CO— added is preferably 4 times higher than the number of catalyst compound equivalents and the final concentration of the compound comprising a —CO—NH—CO— group in the curable polyisocyanate composition is such that the ratio of —CO—NH—CO— groups over the number of isocyanate groups is at most 1, preferably at most 0.01, more preferably at most 0.005.

According to embodiments, a polyisocyanurate comprising material and a process for making said material is disclosed thereby using the curable composition according to the first aspect of the invention.

Said polyisocyanurate comprising material is made by allowing the curable composition according to the first aspect of the invention to react at elevated temperature of at least 90° C., preferably at least 100° C., more preferably at least 120° C., most preferably equal to or at least 125° C. for at least a few minutes and up to 2 hours.

According to embodiments the curable polyisocyanate composition of the first aspect of the invention may form a stable, intermediate and further curable polyisocyanurate comprising material.

The intermediate, further curable polyisocyanurate comprising material according to the invention comprises free isocyanate (NCO) groups, has an NCO value of 5-30% by weight, more preferably an NCO value of 15-25% by weight and has a final concentration of the polyisocyanurate compounds which does not change more than 10% from its initial value (calculated as a change in NCO value) when kept at room temperature (around 20° C.) and ambient pressure for at least several hours, more preferably for minimum 5 hours, most preferably for more than 24 hours.

According to embodiments, the process for making a stable, intermediate and further curable polyisocyanurate comprising material process said process comprising at least the steps of:

- combining and mixing one or more polyisocyanates, one or more aldehyde compounds and one or more compounds selected from compounds which comprise a carboxamide group having the structure —CO—NH$_2$ and/or from compounds which comprise a group having the structure —CO—NH—CO—, and then or at least simultaneously
- Combining and mixing one or more trimerization catalyst compounds in such an amount that the number of equivalents of compounds which comprise a group having the structure —CO—NH$_2$ and/or compounds which comprise a group having the structure —CO—NH—CO— over the number of trimerization catalyst equivalents is below 4 and higher than 0.75, preferably in the range between 1 and 3, more preferably in the range between 1.2 and 2, most preferably in the range between 1 up to 1.5, and then
- Allowing the composition to react such that an elevated temperature below 90° C. is achieved, and then
- Optionally cooling down the composition
- Wherein one or more aldehyde compounds are added before or alternatively after the step of allowing the isocyanate composition which comprises compounds having a group having the structure —CO—NH$_2$ to react with the trimerization catalyst compound in such amounts that the number of equivalents of compounds having a —CO—NH$_2$ in the polyisocyanate composition is smaller than or equal to the number of aldehyde equivalents.

According to an embodiment the step of allowing the composition to react gives rise to an elevated temperature below 90° C. and naturally cools down to room temperature The intermediate and further curable polyisocyanurate comprising material has the advantage that additives can be added to the intermediate polyisocyanurate comprising material such as filler material, fibers, . . . As a result, the intermediate, further curable polyisocyanurate comprising material may further comprise additives and/or to be bonded material such as wood chips, wood dust, wood flakes, wooden plates; paper and cardboard, both shredded or layered; sand, vermiculite, clay, cement and other silicates; ground rubber, ground thermoplastics, ground thermoset materials; honeycombs of any material, like cardboard, aluminium, wood and plastics; metal particles and plates; cork in particulate form or in layers; natural fibers, like flax, hemp and sisal fibers; synthetic fibers, like polyamide, polyolefin, polyaramide, polyester and carbon fibers; mineral fibers, like glass fibers and rock wool fibers; mineral fillers like BaSO$_4$ and CaCO$_3$; nanoparticles, like clays, inorganic oxides and carbons; glass beads, ground glass, hollow glass beads; expanded or expandable beads; untreated or treated waste, like milled, chopped, crushed or ground waste and in particular fly ash; woven and non-woven textiles; and combinations of two or more of these materials.

The intermediate, further curable polyisocyanurate comprising material according to the invention has a further advantage that it is a material in which the formation of polyisocyanurate (PIR reaction) may be stopped (interrupted) intentionally to achieve a desired degree of polyisocyanate conversion into polyisocyanurate and hence intentionally under-cure a polyisocyanate material. State of the art polyisocyanurate comprising materials which still comprise free NCO groups might also cure further but then only at very high temperatures (mostly referred to as "post-curing"), in the scope of this invention further cure means at relatively low temperatures of around 125° C. The further curing according to the invention is always achieved at temperatures below 250° C. According to embodiments, a process for further curing the above described intermediate further curable polyisocyanurate comprising material is disclosed as well as said polyisocyanurate comprising material obtained after further (final) curing.

According to embodiments, the process for further curing the intermediate polyisocyanurate comprising material comprises the step of heating said intermediate polyisocyanurate comprising material which comprises one or more aldehyde compounds at elevated temperatures of at least 90° C., preferably at least 100° C., more preferably at least 120° C., most preferably equal to or at least 125° C. for at least a few minutes and up to 2 hours.

According to an embodiment, the process for further curing the intermediate polyisocyanurate comprising material may further comprise before the step of heating said composition at elevated temperatures of at least 90° C. a step of additionally adding a trimerization catalyst to the intermediate polyisocyanurate comprising material.

According to an embodiment, the process for further curing the intermediate polyisocyanurate comprising material further comprises before the step of heating said composition at elevated temperatures of at least 90° C. a step of adding and mixing additives and/or to be bonded material(s) to the intermediate polyisocyanurate comprising material such as wood chips, wood dust, wood flakes, wooden plates; paper and cardboard, both shredded or layered; sand, vermiculite, clay, cement and other silicates; ground rubber, ground thermoplastics, ground thermoset materials; honeycombs of any material, like cardboard, aluminium, wood and plastics; metal particles and plates; cork in particulate form or in layers; natural fibers, like flax, hemp and sisal fibers; synthetic fibers, like polyamide, polyolefin, polyaramide, polyester and carbon fibers; mineral fibers, like glass fibers and rock wool fibers; mineral fillers like BaSO$_4$ and CaCO$_3$; nanoparticles, like clays, inorganic oxides and carbons; glass beads, ground glass, hollow glass beads; expanded or expandable beads; untreated or treated waste, like milled, chopped, crushed or ground waste and in particular fly ash; woven and non-woven textiles; and combinations of two or more of these materials.

According to an embodiment, the process for further curing the intermediate polyisocyanurate comprising material further comprises another additional post curing step.

Polyisocyanurate comprising materials obtainable by the above described process are disclosed as well.

The independent and dependent claims set out particular and preferred features of the invention. Features from the dependent claims may be combined with features of the independent or other dependent claims as appropriate.

The above and other characteristics, features and advantages of the present invention will become apparent from the detailed description and examples set out further.

DEFINITIONS AND TERMS

In the context of the present invention the following terms have the following meaning:
1) isocyanate index or NCO index or index:
   the ratio of NCO-groups over isocyanate-reactive hydrogen atoms present in a formulation, given as a percentage:

$$\frac{[NCO] \times 100}{[active\ hydrogen]}\ (\%).$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of water, if used) present at the actual polymerisation stage are taken into account.

2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.

3) Reaction system: a combination of components wherein the polyisocyanates are kept in one or more containers separate from the isocyanate-reactive components.

4) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

5) The word "average" refers to number average unless indicated otherwise.

6) Shelf-life as used herein refers to the stability of a compound or composition comprising a compound in a liquid (e.g. the trimerization catalyst composition according to the invention) when stored under ambient conditions (room temperature and ambient pressure) and is calculated as the period of time the compound or composition retains a viscosity low enough to be used in processing and remains suitable for its intended use.

7) Pot-life as used herein refers to the stability of a liquid reactive composition (e.g. the curable composition according to the invention) when stored under ambient conditions (room temperature and ambient pressure) and is calculated as the period of time the reactive composition remains suitable for its intended processing after mixing with reaction-initiating agents and/or subjecting to reaction-initiating conditions (such as subjecting to an elevated temperature).

8) Trimerization catalyst as used herein refers to a catalyst being able to catalyse (promote) the formation of isocyanurate groups from polyisocyanates.

9) Polyisocyanurate comprising material refers to a polyisocyanate composition comprising more than 10% by weight polyisocyanurate, preferably at least 50% by weight polyisocyanurate, more preferably 75% by weight, calculated on the total weight of the material.

10) "(Stable) intermediate, further curable polyisocyanate comprising composition" or "intermediate polyisocyanurate comprising material" according to the present invention is a polyisocyanurate comprising material which is able to cure further and is obtained by reacting the (trimerization) catalyst composition according to the invention in specific amounts, a polyisocyanate composition and optionally one or more aldehyde compounds for a certain period of time thereby reaching a temperature up to 80° C. but certainly below 90° C. such that a partly cured polyisocyanurate comprising material is obtained which still comprises free isocyanate (NCO) groups, has an NCO value of 5-30% by weight, more preferably an NCO value of between 15 and 25% and wherein the final concentration of the polyisocyanurate compounds does not change more than 10% from its initial value (calculated as a change in NCO value) when kept at room temperature (around 20° C.) and ambient pressure for at least several hours up to days and even up to several weeks, preferably for 1 hour, more preferably for minimum 5 hours, most preferably for more than 24 hours.

11) "Further cured polyisocyanurate comprising material" according to the present invention is a polyisocyanurate comprising material which is obtained by heating up the intermediate, further curable polyisocyanurate comprising material according to the invention to a temperature of at least 90° C., preferably at least 100° C., more preferably at least 120° C., most preferably at least 125° C. for at least a few minutes such that the left over free isocyanate groups reacts to form polyisocyanurate comprising compounds. Said further cured polyisocyanurate comprising material having an increased isocyanate conversion and less or alternatively almost no remaining free reactive isocyanate groups compared to the intermediate polyisocyanurate comprising material.

DETAILED DESCRIPTION

The present invention relates to aldehyde compounds suitable for making curable polyisocyanate compositions such that the curing temperature required to let the curable composition react in order to make polyisocyanurate comprising materials could be significantly lowered compared to state of the art curable polyisocyanate composition comprising epoxy compounds (see PCT/EP2011/069562). It was further found that the pot-life of the curable compositions according to the invention is comparable to a state of the art curable composition based on an epoxy comprising resins.

According to a first aspect a curable polyisocyanate comprising composition is disclosed and a process for making said curable composition. Said curable composition comprising:
one or more polyisocyanate compounds, and
one or more aldehyde compounds, and
one or more compounds which comprises a carboxamide group having the structure —CO—NH$_2$ and/or compounds which comprise a group having the structure —CO—NH—CO—, and
one or more trimerization catalyst compound
wherein the number of equivalents of compounds which comprise a carboxamide group having the structure —CO—NH$_2$ and/or from compounds which comprise a group having the structure —CO—NH—CO— is smaller or equal than the number of aldehyde equivalents and
wherein the number of equivalents of compounds which comprise a carboxamide group and/or a compounds which comprise a group having the structure —CO—NH—CO added to a polyisocyanate composition is at least 0.75 times the number of trimerization catalyst equivalents added to a polyisocyanate composition.

According to embodiments, the number of equivalents of compounds which comprises a carboxamide group and/or compounds which comprise a group having the structure —CO—NH—CO— per aldehyde equivalent is 0.0005-1 and preferably 0.005-0.7 and most preferably 0.01-0.5.

According to embodiments, the aldehyde compound is selected from compounds with the structure R—CHO wherein R may be any generic hydrocarbyl group such as an alkyl, alkenyl or aryl side chain.

According to embodiments the aldehyde compound is selected from compounds with the structure R—CHO wherein CHO is an aldehyde functional group and R is a hydrocarbyl group preferably having 1-50 carbon atoms, preferably 1-20 carbon atoms.

According to embodiments the hydrocarbyl group R in the aldehyde compound according to the invention is a combination of linear, branched, saturated, unsaturated, cyclic and/or non-cyclic aliphatic, aromatic or araliphatic hydrocarbyls and mixtures of such compounds.

According to embodiments the hydrocarbyl group R in the aldehyde compound according to the invention comprises 1 or more unsaturations and/or optionally 1 or more aromatic rings and/or optionally further comprises heteroatoms. Said heteroatoms may be selected from oxygen, halogens, nitrogen.

According to embodiments the hydrocarbyl group R in the aldehyde compound according to the invention further comprises one or more functional group comprising heteroatoms. Said functional group may be selected from an hydroxy, halogen, carboxyl, ester, ether and/or amine group and combination of such groups.

According to embodiments the aldehyde compound is selected from compounds with the structure R—CHO wherein R is a hydrocarbyl group which may further comprise one or more additional aldehyde functional groups.

According to embodiments the aldehyde compound may be selected from compounds with the structure R—CHO wherein R is a hydrocarbyl group which has 1-4 carbon atoms and preferably comprises a functional group which is reactive towards other compounds in the polyisocyanate composition to avoid evaporation during further processing, more preferably these functional groups are reactive towards NCO groups (originating from polyisocyanates).

According to embodiments the aldehyde compound may be selected from compounds with the structure R—CHO wherein R is a hydrocarbyl group which has 1-4 carbon atoms. To avoid evaporation during processing a pressurized mould may be used.

Examples of suitable aldehyde compounds are benzaldehyde (I), hexananal (II), butyraldehyde (III).

(I)

(II)

(III)

According to embodiments, the carboxamide group in the one or more compounds comprising a carboxamide group preferably is selected from a compound according to the formula NH$_2$—CO—R wherein R is 1) hydrogen (—H), 2) —NR$_1$R$_2$, 3) hydrocarbyl having 1-20 carbon atoms and optionally comprising hydroxy, ether, halogen and/or amine groups, or 4) —R$_3$—CO—NH$_2$, wherein R$_1$ and R$_2$, independently from each other, are selected from hydrogen, hydroxy, halogen and hydrocarbyl groups which hydrocarbyl groups have 1-10 carbon atoms and optionally comprise hydroxy, ether, halogen and/or amine groups and wherein R$_3$ is a bivalent hydrocarbon radical having up to 8 carbon atoms. Mixtures of these carboxamides may be used as well. Preferably such carboxamides have a molecular weight of at most 499.

The hydrocarbyl groups in these carboxamides may be linear or branched, saturated or unsaturated and cyclic or non-cyclic; they may be aliphatic, aromatic or araliphatic.

More preferred carboxamides are those wherein R is 1) —NR$_1$R$_2$, 2) alkyl having 1-10 carbon atoms and optionally comprising 1-3 hydroxy and/or ether groups, 3) phenyl or 4) tolyl, wherein R$_1$ and R$_2$, independently from each other, are selected from hydrogen, hydroxy, phenyl, tolyl and alkyl having 1-6 carbon atoms and optionally comprising an hydroxy and/or an ether group. Mixtures of such more preferred compounds are also more preferred.

Examples of very useful carboxamides are the following ones.

| R | Name |
|---|---|
| —NH$_2$ | Urea |
| —NHOH | Hydroxyurea |
| —NH(CH$_3$) | N-Methyl urea |

-continued

| R | Name |
|---|---|
| —N(CH$_3$)$_2$ | 1,1-dimethyl urea |
| —N(C$_2$H$_5$)$_2$ | 1,1-diethyl urea |
| —NH—C$_6$H$_5$ | Phenylurea |
| —NH—C$_6$H$_4$—CH$_3$ | Tolylurea |
| —H | Formamide |
| —CH$_3$ | Ethanamide |
| —C$_2$H$_5$ | Propionamide |
| —OC$_2$H$_5$ | Ethyl carbamate |
| —OC$_4$H$_9$ | Butyl carbamate |
| —OC$_6$H$_5$ | Phenyl carbamate |
| —OCH$_2$—CH$_2$OH | Hydroxyethyl carbamate |
| —OCH(CH$_3$)—CH$_2$OH | Hydroxypropyl carbamate |
| —CH(CH$_3$)—OH | Lactamide |
| —C$_6$H$_5$ | Benzamide |
|  | Nicotinamide |

Most preferably urea is used. It is to be noted that in calculating the number of carboxamide equivalents urea is regarded as containing 2 carboxamide groups.

According to embodiments, the compound comprising a group having the structure —CO—NH—CO— may be a compound having the structure R$_1$—CO—NH—CO—R$_2$ wherein R$_1$ and R$_2$ each independently from each other are selected from 1) hydrogen (—H), 2) —NR$_3$R$_4$, 3) hydrocarbyl having 1-100 carbon atoms and optionally comprising hydroxy, ether, halogen, carboxyl, oxygen, isocyanate and/or amine groups wherein R$_3$ and R$_4$ independently from each other, are selected from hydrogen, hydroxy, halogen and hydrocarbyl groups which hydrocarbyl groups have 1-20 carbon atoms and optionally comprise hydroxy, ether, halogen, carboxyl, isocyanate and/or amine groups, wherein R$_1$ and R$_2$ may be linked to each other essentially forming a ring structure including the —CO—NH—CO— group, and wherein the hydrocarbyl groups in the compounds corresponding to the formula R$_1$—CO—NH—CO—R$_2$ may be a combination of linear, branched, saturated, unsaturated, cyclic and/or non-cyclic aliphatic, aromatic or araliphatic hydrocarbyls and mixtures of such compounds.

According to embodiments, the compound comprising a group having the structure —CO—NH—CO— may be a compound having the structure R$_1$—CO—NH—CO—R$_2$ wherein R$_1$ and R$_2$ together with the —CO—NH—CO— group form a 4 to 12 membered ring structure including the —CO—NH—CO— group.

According to an embodiment, the compound comprising a group having the structure —CO—NH—CO— may be a compound comprising a —CO—NH—CO— NH— group and may be a reaction product of a compound comprising a carboxamide group having the structure —CO—NH$_2$ and a polyisocyanate compound comprising a reactive NCO group. Said compound may correspond to R$_6$—CO—NH—CO— NH—R$_7$ wherein the compound comprising a carboxamide group may corresponds to NH$_2$—CO—R$_6$ wherein R$_6$ is 1) hydrogen (—H), 2) —NR$_8$R$_9$, 3) hydrocarbyl having 1-20 carbon atoms and optionally comprising hydroxy, ether, halogen and/or amine groups, or 4) —R$_{10}$—CO—NH$_2$, wherein R$_8$ and R$_9$, independently from each other, are selected from hydrogen, hydroxy, halogen and hydrocarbyl groups which hydrocarbyl groups have 1-10 carbon atoms and optionally comprise hydroxy, ether, halogen and/or amine groups and wherein R$_{10}$ is a bivalent hydrocarbon radical having up to 8 carbon atoms and mixtures of these carboxamides, and wherein the compound comprising a reactive NCO group corresponds to R$_7$—NCO and wherein R$_7$ is selected from hydrogen and hydrocarbyl groups which hydrocarbyl groups have 1-20 carbon atoms and optionally comprise hydroxy, ether, halogen, carboxyl, isocyanate and/or amine groups and wherein said hydrocarbyl groups may be a combination of linear, branched, saturated, unsaturated, cyclic and/or non-cyclic aliphatic, aromatic or araliphatic hydrocarbyls and mixtures of such compounds.

According to an embodiment, the compound comprising a group having the structure —CO—NH—CO— may be a compound comprising a —CO—NH—CO— NH— group and may be a reaction product of a compound comprising a carboxamide group having the structure —CO—NH$_2$ and a polyisocyanate compound comprising a reactive NCO group. Said compound may correspond to R$_6$—CO—NH—CO— NH—R$_7$ wherein R$_6$ is selected from 1) —NR$_8$R$_9$, 2) alkyl having 1-10 carbon atoms and optionally comprising 1-3 hydroxy and/or ether groups, 3) phenyl or 4) tolyl wherein R$_8$ and R$_9$, independently from each other, are selected from hydrogen, hydroxy, phenyl, tolyl and alkyl having 1-6 carbon atoms and optionally comprising an hydroxy and/or an ether and mixtures of such compounds.

According to embodiments, the polyisocyanate compounds used for making the polyisocyanate composition according to the present invention may be selected from aliphatic and, preferably, aromatic polyisocyanates. Preferred aliphatic polyisocyanates are hexamethylene diisocyanate, isophorone diisocyanate, methylene dicyclohexyl diisocyanate and cyclohexane diisocyanate and preferred aromatic polyisocyanates are toluene diisocyanate, naphthalene diisocyanate, tetramethylxylene diisocyanate, phenylene diisocyanate, tolidine diisocyanate and, in particular, methylene diphenyl diisocyanate (MDI) and polyisocyanate compositions comprising methylene diphenyl diisocyanate (like so-called polymeric MDI, crude MDI, uretonimine modified MDI and prepolymers having free isocyanate groups made from MDI and polyisocyanates comprising MDI) and mixtures of such polyisocyanates. MDI and polyisocyanate compositions comprising MDI are most preferred and especially those selected from 1) a diphenylmethane diisocyanate comprising at least 35%, preferably at least 60% by weight of 4,4'-diphenylmethane diisocyanate (4,4'-MDI); 2) a carbodiimide and/or uretonimine modified variant of polyisocyanate 1), the variant having an NCO value of 20% by weight or more; 3) a urethane modified variant of polyisocyanate 1) and/or 2), the variant having an NCO value of 20% by weight or more and being the reaction product of an excess of polyisocyanate 1) and/or 2) and of a polyol having an average nominal hydroxyl functionality of 2-4 and an average molecular weight of at most 1000; 4) a diphenylmethane diisocyanate comprising a homologue comprising 3 or more isocyanate groups; 5) prepolymers having an NCO value of 5-30% by weight and being the reaction product of any one or more of polyisocyanates 1)-4) and of a polyol having an average nominal hydroxyl functionality of 2-4 and an average molecular weight of more than 1000 and up to 8000; and 6) mixtures of any of the aforementioned polyisocyanates.

Polyisocyanate 1) comprises at least 35% by weight of 4,4'-MDI. Such polyisocyanates are known in the art and include pure 4,4'-MDI and isomeric mixtures of 4,4'-MDI, 2,4'-MDI and 2,2'-MDI. It is to be noted that the amount of 2,2'-MDI in the isomeric mixtures is rather at an impurity level and in general will not exceed 2% by weight, the remainder being 4,4'-MDI and 2,4'-MDI. Polyisocyanates as these are known in the art and commercially available; for example Suprasec$^R$ MPR and 1306 ex Huntsman (Suprasec is a trademark of the Huntsman Corporation or an affiliate thereof which has been registered in one or more but not all countries).

The carbodiimide and/or uretonimine modified variants of the above polyisocyanate 1) are also known in the art and commercially available; e.g. Suprasec$^R$ 2020, ex Huntsman. Urethane modified variants of the above polyisocyanate 1) are also known in the art, see e.g. The ICI Polyurethanes Book by G. Woods 1990, $2^{nd}$ edition, pages 32-35.

Polyisocyanate 4) is also widely known and commercially available. These polyisocyanates are often called crude MDI or polymeric MDI. Examples are Suprasec$^R$ 2185, Suprasec$^R$ 5025 and Suprasec$^R$ DNR ex Huntsman.

The prepolymers (polyisocyanate 5)) are also widely known and commercially available. Examples are Suprasec$^R$ 2054 and Suprasec$^R$ 2061, both ex Huntsman.

Mixtures of the aforementioned polyisocyanates may be used as well, see e.g. The ICI Polyurethanes Book by G. Woods 1990, $2^{nd}$ edition pages 32-35. An example of such a commercially available polyisocyanate is Suprasec$^R$ 2021 ex Huntsman.

According to embodiments, the polyisocyanate compounds in the polyisocyanate composition are selected from a toluene diisocyanate, a methylene diphenyl diisocyanate or a polyisocyanate composition comprising a methylene diphenyl diisocyanate or a mixture of such polyisocyanates According to some embodiments, the polyisocyanate composition may further comprise a solvent which has no isocyanate-reactive groups on top of the above cited compounds.

According to embodiments, the polyisocyanate composition may further comprise a monool and/or a polyol solvent on top of the above cited compounds.

Preferably said polyol/monool composition comprises polyester and/or polyether polyols having an average molecular weight of preferably 32-6000 and an average nominal functionality of preferably 1-8. Mixtures of monools and/or polyols may be used as well.

Examples of such monools are methanol, ethanol, propanol, butanol, phenol, cyclohexanol and hydrocarbon monools having an average molecular weight of 200-5000 like aliphatic and polyether monools. Examples of polyols are ethylene glycol, diethylene glycol, triethylene glycol, propylene glycol, dipropylene glycol, tripropylene glycol, trimethylol propane, sorbitol, sucrose, glycerol, ethanediol, propanediol, butanediol, pentanediol, hexanediol, aromatic and/or aliphatic polyols having more carbon atoms than these compounds and having a molecular weight of up to 8000, polyester polyols having an average molecular weight of 200-8000, polyether polyester polyols having an average molecular weight of 200-8000 and polyether polyols having an average molecular weight of 200-8000. Such monools and polyols are commercially available. Useful examples are Daltocel F526, Daltocel F555 and Daltocel F442, which are all polyether triols from Huntsman, Voranol P400 and Alcupol R1610, which are polyether polyols from DOW and Repsol, respectively, and Priplast 1838 and 3196 which are high molecular weight polyester polyols from Croda having a molecular weight of 2000 and 3000 respectively, and Capa 2043 polyol, a linear polyesterdiol of average molecular weight of about 400 from Perstorp, and K-flex polyols 188 and A308 which are polyester polyols from King Industries having a molecular weight of about 500 and 430 respectively, and aromatic polyester polyols like Stepanpol PH56 and BC180 having average molecular weights of about 2000 and 600 respectively, and Neodol 23E which is an aliphatic monool from Shell.

Most preferred are polyester and polyether polyols having an average molecular weight of 200-6000 and an average nominal functionality of 2-4.

The solvent, which optionally may be used, should have no isocyanate-reactive groups. Preferred solvents are organic solvents which are liquids at 25° C. Solvents having a viscosity at 25° C. of 3000 mPa·s or less as measured according to ASTM D445-11a are regarded as liquid solvents. Most preferred are organic, liquid solvents which are able to dissolve more than 1 mg of a certain compound comprising the carboxamide group per liter solvent at 25° C.

Those skilled in the art can easily determine whether or not an organic liquid is suitable for use as solvent in the present invention, certainly with the above guidance. Examples of suitable solvents are esters (such as ethyl acetate, propyl acetate, propylene carbonate, phthalate esters), ketones (such as acetone, methyl ethyl ketone, methyl isobutyl ketone, cyclohexanone), aliphatic hydrocarbons (such as cyclohexane, heptane), chlorinated hydrocarbons (such as chloroform, dichloromethane), aromatic solvents (such as benzene, toluene), ethers (such as diethyl ether, dioxane, tetrahydrofuran) and mixtures thereof. Most preferably solvents are selected which have a low boiling point at ambient pressure or under vacuum (then they may be stripped off from the curable composition easily). They should preferably be able to dissolve at least 10 g of carboxamide per liter of solvent. The amount of solvent may vary between wide ranges. The lower limit is determined by the desired type and amount of compound comprising the carboxamide and its solubility in the selected solvent. The upper limit is determined by considerations of convenience and cost: the less the better.

According to a second aspect of the present invention, a process for making the curable polyisocyanate composition according to the first aspect of the invention is disclosed According to embodiments, the process for making the curable polyisocyanate composition according to the first aspect of the invention comprises mixing and/or combining at least:
- a first liquid comprising one or more aldehyde compounds, one or more polyisocyanate compounds and one or more compounds selected from compounds which comprise a carboxamide group having the structure —CO—NH$_2$ and/or from compounds which comprise a group having the structure —CO—NH—CO— and optionally a solvent which has no isocyanate-reactive groups, and/or a monool and/or a polyol solvent and/or monool/polyol composition, with
- a second liquid comprising one or more trimerization catalyst compounds optionally dissolved in a solvent, which has no isocyanate-reactive groups and/or a polyol/monool composition which preferably comprises polyester and/or polyether polyols having an average molecular weight of preferably 32-6000 and an average nominal functionality of preferably 1-8.

Wherein the number of equivalents of compounds having a —CO—NH—CO— group in the curable polyisocyanate composition is smaller or equal than the number of aldehyde equivalents and the number of equivalents of compounds which comprise a carboxamide group and/or a compounds which comprise a group having the structure —CO—NH—CO added to a polyisocyanate composition is at least 0.75 times the number of trimerization catalyst equivalents added to a polyisocyanate composition.

According to embodiments, the number of aldehyde equivalents per isocyanate equivalents in the curable polyisocyanate composition ranges from 0.003-1 and preferably from 0.003-0.5 and most preferably from 0.005-0.25. The compounds in the curable composition are preferably combined and mixed under ambient conditions. The relative amounts of the ingredients in the curable composition are chosen in a way so as to provide an index of at least 300.

According to embodiments, the process for making the curable polyisocyanate composition comprises at least the steps of:

Combining and mixing one or more aldehyde compounds, one or more polyisocyanates and one or more compounds selected from compounds which comprise a carboxamide group having the structure —CO—NH$_2$ and/or from compounds which comprise a group having the structure —CO—NH—CO—, and then or at least simultaneously Combining and mixing one or more trimerization catalyst compounds optionally dissolved in a solvent, which has no isocyanate-reactive groups, and/or a polyol/monool composition which preferably comprises polyester and/or polyether polyols having an average molecular weight of preferably 32-6000 and an average nominal functionality of preferably 1-8, and with optionally a solvent, which has no isocyanate-reactive groups and/or a polyol/monool composition which preferably comprises polyester and/or polyether polyols having an average molecular weight of preferably 32-6000 and an average nominal functionality of preferably 1-8.

Wherein the number of equivalents of compounds having a —CO—NH—CO— group in the curable polyisocyanate composition is smaller or equal than the number of aldehyde equivalents and the number of equivalents of compounds selected from compounds which comprises a carboxamide group added to the polyisocyanate composition is higher than 0.75 times the number of trimerization catalyst equivalents added to the polyisocyanate composition According to embodiments, the number of equivalents of compounds which comprise a carboxamide group having the structure —CO—NH$_2$ and/or a compounds which comprise a group having the structure —CO—NH—CO added to a polyisocyanate composition is at least greater than the number of trimerization catalyst equivalents added to a polyisocyanate composition.

According to embodiments, the trimerization catalyst is added simultaneously with addition of the compounds which comprises a carboxamide group having the structure —CO—NH$_2$ and/or compounds which comprise a group having the structure —CO—NH—CO— in the polyisocyanate composition such that the initial number of equivalents of compounds comprising a carboxamide group having the structure —CO—NH$_2$ is preferably 4 times higher (or more) than the number of catalyst compound equivalents and the final concentration of the compound comprising a —CO—NH—CO— group in the curable polyisocyanate composition is such that the ratio of —CO—NH—CO— groups over the number of isocyanate groups is at most 1, preferably at most 0.01, more preferably at most 0.005 in order to achieve an almost fully cured polyisocyanate material (polyisocyanurate comprising material).

According to embodiments, the trimerization catalyst is added after addition of compounds which comprises a carboxamide group having the structure —CO—NH$_2$ and/or compounds which comprise a group having the structure —CO—NH—CO— in the polyisocyanate composition such that the final concentration of the compound comprising a —CO—NH—CO— group in the curable polyisocyanate composition is such that the ratio of —CO—NH—CO— groups over the number of isocyanate groups is at most 1, preferably at most 0.01, more preferably at most 0.005.

According to an embodiment, the trimerization catalyst compound is selected from one or more organic salts, preferably said organic salt is selected from alkali metal, earth alkali metal and/or quaternary ammonium organic salts, more preferably from carboxylates and/or alkoxides such as potassium acetate, potassium hexanoate, potassium ethylhexanoate, potassium octanoate, potassium lactate, sodium ethoxide, sodium formate, potassium formate, sodium acetate, potassium benzoate and mixtures thereof.

According to an embodiment, the trimerization catalyst is an organic metal salt selected from a carboxylate or alkoxide and is preferably selected from one or more of potassium acetate, potassium hexanoate, potassium ethylhexanoate, potassium octanoate, potassium lactate, sodium ethoxide, sodium formate, potassium formate, sodium acetate, potassium benzoate and mixtures thereof.

According to an embodiment, the trimerization catalyst compound is selected from a composition containing a lithium halide and an epoxy resin provided that the number of Lithium-halide equivalents over the number of epoxy equivalents is in the range 1:2 to 1:80, more preferably in the range 1:2 to 1:40, and even more preferably 1:4 to 1:30. Preferably the lithium halide is selected from lithium chloride and lithium bromide, lithium chloride is most preferred. Said catalyst composition containing a lithium halide (preferably LiCl) and an epoxy resin may further comprise an urea compound in such an amount that the number of urea+biuret equivalents per mole of lithium halide ranges of from 0.5-60 and most preferably of from 0.5-30. In calculating said number of urea equivalents, the urea groups in the carboxamides are not taken into account. The urea compound used in the polyisocyanate composition used according to the present invention has an average molecular weight of 500-15000 and preferably of 600-10000 and most preferably of 800-8000. Such urea compounds are prepared by reacting polyisocyanates and amines. The polyisocyanates used to prepare such urea compound may be selected from the polyisocyanates mentioned above. The amines used to prepare the urea compounds may be monoamines or polyamines. Preferably monoamines, optionally comprising a small amount of polyamines, are used. The average amine functionality of such mixtures preferably is at most 1.2. Most preferably only monoamines are used. Such amines preferably are primary amines. The epoxy resin used preferably is selected from any epoxy resin which is liquid at 20° C. Examples of suitable epoxy resins for use in combination with a lithium halide are 1) polyglycidyl and poly(β-methylglycidyl) esters, 2) polyglycidyl or poly(β-methylglycidyl) ethers, 3) poly(N-glycidyl) compounds, 4) poly(S-glycidyl) compounds, for example di-S-glycidyl derivatives, 5) cycloaliphatic epoxy resins, such as, for example, bis(2,3-epoxycyclopentyl) ether, 2,3-epoxycyclopentyl glycidyl ether, 1,2-bis(2,3-epoxycyclopentyloxy) ethane or 3,4-epoxycyclohexylmethyl-3',4'-epoxycyclohexanecarboxylate.

It is also possible to use epoxy resins in which the 1,2-epoxy groups are bonded to different hetero atoms or functional groups; these compounds include, for example, the N,N,O-triglycidyl derivative of 4-aminophenol, the glycidyl ether-glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

Particularly preferred are those mentioned in 1) and 2) and most preferred are those mentioned in 2). The curable composition so obtained has a good stability under ambient conditions. It is used to make a polyisocyanurate material preferably having a Tg (measured according to ASTM D4065) of at least 120° C. by allowing it to react at elevated temperature, preferably above 50° C. and most preferably above 80° C. Therefore the invention is further concerned with a polyisocyanurate material made by allowing a curable composition according to the present invention to react at elevated temperature and with a polyisocyanurate material obtainable by allowing a curable composition according to the present invention to react at elevated temperature and with a process for making these polyisocyanurate materials by allowing a curable composition according to the present invention to react at elevated temperature. Preferably the reaction is conducted at an index of at least 300. Preferably heat is applied in order to bring the curable composition to a temperature above 50° C. and most preferably above 80° C. Then the curable composition may cure fast (so-called snap-cure) while the temperature increases further (the reaction is exothermic).

The curable compositions according to the present invention may be used in a wide variety of composite processing methods to make a wide variety of composite materials. For example, they may be used to repair an object and in particular a pipe by applying them onto the interior and/or the exterior surface of such an object or such a pipe according to the so-called cured in place method. The curable compositions according to the present invention may be used in resin transfer moulding to produce door panels or honeycomb like structures, in vacuum assisted resin infusion to make structural automotive parts such as car bonnets or chassis rails, in filament winding to produce pressure vessels or gas tanks and in pultrusion to make glass fibre reinforced composite ladders or to produce prepregs used in printed circuit boards and in sheet and bulk moulding compounding processes. The polyisocyanurate composite materials according to the present invention may further be used in sporting goods, in high volume production of automotive parts, in train parts, aerospace, marine applications, wind power devices, window lineals, structural parts, adhesives, packaging, encapsulants and insulators. Before curing it, the curable composition may be fed into a mould in order to give it a certain shape or into a cavity of an object in order to provide the object with a polyisocyanurate interior or onto a surface to provide such a surface with a polyisocyanurate cover or it may be used to repair an object and in particular a pipe by applying it onto the interior and/or the exterior surface of such an object or such a pipe (examples of such pipe repair have been described in U.S. Pat. Nos. 4,009,063, 4,366,012 and 4,622,196) or it may be used to bind materials as has been disclosed in WO 2007/096216.

Before the curable composition is cured, additives may be added to it or to its constituents. Examples of additives are other catalysts, blowing agents, surfactants, water scavengers, like alkylorthoformate and in particular tri-isopropylorthoformate, antimicrobial agents, fire retardants, smoke suppressants, UV-stabilizers, colorants, plasticizers, internal mould release agents, rheology modifiers, wetting agents, dispersing agents and fillers.

According to embodiments, a polyisocyanurate comprising material and a process for making said material is disclosed thereby using the curable composition according to the first aspect of the invention. Said polyisocyanurate comprising material may be made by allowing the curable composition according to the first aspect of the invention to react at elevated temperature.

According to embodiments the curable polyisocyanate composition of the first aspect of the invention may form a stable, intermediate and further curable polyisocyanurate comprising material.

The intermediate, further curable polyisocyanurate comprising material according to the invention comprises free isocyanate (NCO) groups, has an NCO value of 5-30% by weight, more preferably an NCO value of 15-25% by weight and has a final concentration of the polyisocyanurate compounds which does not change more than 10% from its initial value (calculated as a change in NCO value) when kept at room temperature (around 20° C.) and ambient pressure for at least several hours, more preferably for minimum 5 hours, most preferably for more than 24 hours.

The intermediate and further curable polyisocyanurate comprising material has the advantage that additives can be added to the intermediate polyisocyanurate comprising material such as filler material, fibers . . . As a result, the intermediate, further curable polyisocyanurate comprising material may further comprise additives and/or to be bonded material such as wood chips, wood dust, wood flakes, wooden plates; paper and cardboard, both shredded or layered; sand, vermiculite, clay, cement and other silicates; ground rubber, ground thermoplastics, ground thermoset materials; honeycombs of any material, like cardboard, aluminium, wood and plastics; metal particles and plates; cork in particulate form or in layers; natural fibers, like flax, hemp and sisal fibers; synthetic fibers, like polyamide, polyolefin, polyaramide, polyester and carbon fibers; mineral fibers, like glass fibers and rock wool fibers; mineral fillers like $BaSO_4$ and $CaCO_3$; nanoparticles, like clays, inorganic oxides and carbons; glass beads, ground glass, hollow glass beads; expanded or expandable beads; untreated or treated waste, like milled, chopped, crushed or ground waste and in particular fly ash; woven and non-woven textiles; and combinations of two or more of these materials.

The intermediate, further curable polyisocyanurate comprising material according to the invention has a further advantage that it is a material in which the formation of polyisocyanurate (PIR reaction) may be stopped (interrupted) intentionally to achieve a desired degree of polyisocyanate conversion into polyisocyanurate and hence intentionally under-cure a polyisocyanate material. State of the art polyisocyanurate comprising materials which still comprise free NCO groups might also cure further but then only at very high temperatures (mostly referred to as "post-curing"), in the scope of this invention further cure means at relatively low temperatures of around 125° C. The further curing according to the invention is always achieved at temperatures below 250° C.

It was found that the catalytic activity of a polyisocyanate trimerization catalyst in the curable polyisocyanate composition of the first aspect of the invention may be interrupted (stopped). To achieve said interruption, any trimerization catalyst suitable for forming polyisocyanurate comprising materials starting from polyisocyanates in combination with compounds which comprise a carboxamide group having the structure —CO—$NH_2$ available in the state of the art could be used. Examples of such catalysts are metal or quaternary ammonium carboxylates and alkoxides, tertiary amine derivatives, Li-halides (LiCl) in combination with epoxy (LiCl/epoxy catalyst), . . . .

Surprisingly the catalytic activity of a polyisocyanate trimerization catalyst in a polyisocyanate composition may be interrupted and re-activated. The trimerization catalyst is preferably selected from organic salts, preferably from alkali metal, earth alkali metal and/or quaternary ammonium organic salts. More preferably said organic salt is selected from carboxylates or alkoxides and mixtures thereof, the carboxylate/alkoxide group preferably having 1-12 carbon atoms and mixtures thereof. Preferred examples are sodium carboxylates, potassium carboxylates, sodium alkoxides and potassium alkoxides. Alternatively the catalytic activity of a polyisocyanate trimerization catalyst in a polyisocyanate composition may be interrupted and re-activated by using a LiCl/epoxy catalyst in which the number of LiCl equivalents over the number of epoxy equivalents is in the range 1:2 to 1:80, more preferably in the range 1:2 to 1:40, and even more preferably 1:4 to 1:30.

The interruption and/or re-activation of the catalytic activity of the polyisocyanate trimerization catalyst is realized by adding the trimerization catalyst in combination with a compound which is selected from compounds which comprises a carboxamide group having the structure —CO—NH$_2$ and/or compounds which comprise a group having the structure —CO—NH—CO—, to the polyisocyanate composition such that the ratio of compounds which comprise a carboxamide group over the catalyst corresponds to pre-defined ratios, and subsequently subjecting the polyisocyanate composition to predefined heating steps.

Adding the trimerization catalyst in combination with a compound which is selected from compounds which comprises a carboxamide group having the structure —CO—NH$_2$ and/or compounds which comprise a group having the structure —CO—NH—CO—, to the polyisocyanate composition and subsequently allowing this composition with one or more aldehyde compounds to react gives rise to elevated temperatures (lower than 90° C.). Depending on the ratios between the different components of the composition and processing conditions more or less elevated temperatures (lower than 90° C.) will be reached. The reaction will stop at a certain point and cool down to room temperature (naturally, by itself) such that a stable partly cured polyisocyanate composition or intermediate polyisocyanurate comprising material is obtained. An elevated temperature of around 80° C. can be achieved without adding extra heat since the formation of the polyisocyanurate comprising material is exothermic.

Such an interruption of the trimerization reaction leads to partly cured polyisocyanate materials or in other words to intermediate polyisocyanurate comprising materials which may be particularly desirable when products are to be made according to processes which require a certain viscosity before producing the final cured products. In all these processes a one-component composition is desired as starting material which has a certain degree of viscosity, and which shows no or little reaction at ambient conditions for a given period of time in order to allow such compositions to be handled in such processes.

To allow the interruption of the trimerization reaction, the number of equivalents of compounds selected from compounds which comprises a carboxamide group having the structure —CO—NH$_2$ added to a polyisocyanate composition is smaller than four times the number of trimerization catalyst equivalents and higher than 0.75 times the number of trimerization catalyst equivalents added to a polyisocyanate composition. Preferably the number of equivalents of compounds selected from compounds which comprise a carboxamide group having the structure —CO—NH$_2$ to the number of trimerization catalyst equivalents is in the range between 1 to 3, more preferably in the range between 1.2 and 2 in order to form the "stable" intermediate polyisocyanurate comprising material according to the invention. Most preferably, the number of equivalents of compounds comprising a carboxamide group having the structure —CO—NH$_2$ over the number of trimerization catalyst equivalents is in the range between 1 and 1.5. The ratio of the number of equivalents of compounds which comprise a carboxamide group having the structure —CO—NH$_2$ over the number of trimerization catalyst equivalents may be 1 or close to 1.

Surprisingly the pot-life of the intermediate (partly cured) polyisocyanurate comprising material is up to several days and longer by using a trimerization catalyst composition having a specific ratio of trimerization catalyst over compounds which comprises a carboxamide group having the structure —CO—NH$_2$ without negatively influencing the final curing of the partly cured polyisocyanate composition or intermediate polyisocyanurate material afterwards.

According to embodiments, the process for making a stable, intermediate and further curable polyisocyanurate comprising material comprises at least the steps of:

Combining and mixing a polyisocyanate composition and one or more compounds which comprise a group having the structure —CO—NH$_2$, and then or at least simultaneously Combining and mixing one or more trimerization catalyst compounds in such amount that the number of equivalents of compounds which comprise a group having the structure —CO—NH$_2$ over the number of trimerization catalyst equivalents is below 4 and higher than 0.75, preferably in the range between 1 and 3, more preferably in the range between 1.2 and 2, most preferably in the range between 1 up to 1.5, and then Allowing the composition to react, and then Optionally cooling down the composition Wherein one or more aldehyde compounds according to the present invention are added before or alternatively after the step of allowing the isocyanate composition which comprises compounds having a group having the structure —CO—NH$_2$ to react with the trimerization catalyst compound in such amounts that the number of equivalents of compounds having a —CO—NH$_2$ group and/or compounds which comprise a group having the structure —CO—NH—CO— in the polyisocyanate composition is smaller than or equal to the number of aldehyde equivalents.

According to an embodiment the step of allowing the composition to react gives rise to an elevated temperature below 90° C. and naturally cools down to room temperature.

According to embodiments, a process for further curing the intermediate further curable polyisocyanurate comprising material is disclosed as well as said polyisocyanurate comprising material obtained after further (final) curing.

According to embodiments, the process for further curing the intermediate polyisocyanurate comprising material comprises the step of heating said intermediate polyisocyanurate comprising material which comprises one or more aldehyde compounds at elevated temperatures of at least 90° C., preferably at least 100° C., more preferably at least 120° C., most preferably equal to or at least 125° C. for at least a few minutes and up to 2 hours.

According to an embodiment, the process for further curing the intermediate polyisocyanurate comprising material may further comprise before the step of heating said composition at elevated temperatures of at least 90° C. a step of additionally adding a trimerization catalyst to the intermediate polyisocyanurate comprising material.

According to an embodiment, the process for further curing the intermediate polyisocyanurate comprising material further comprises before the step of heating said composition at elevated temperatures of at least 90° C. a step of adding and mixing additives and/or to be bonded material(s) to the intermediate polyisocyanurate comprising material such as wood chips, wood dust, wood flakes, wooden plates; paper and cardboard, both shredded or layered; sand, vermiculite, clay, cement and other silicates; ground rubber, ground thermoplastics, ground thermoset materials; honeycombs of any material, like cardboard, aluminium, wood and plastics; metal particles and plates; cork in particulate form or in layers; natural fibers, like flax, hemp and sisal fibers; synthetic fibers, like polyamide, polyolefin, polyaramide, polyester and carbon fibers; mineral fibers, like glass fibers and rock wool fibers; mineral fillers like $BaSO_4$ and $CaCO_3$; nanoparticles, like clays, inorganic oxides and carbons; glass beads, ground glass, hollow glass beads; expanded or expandable beads; untreated or treated waste, like milled, chopped, crushed or ground waste and in particular fly ash; woven and non-woven textiles; and combinations of two or more of these materials.

According to an embodiment, the process for further curing the intermediate polyisocyanurate comprising material may further comprise another additional post curing step.

Polyisocyanurate comprising materials obtainable by the above described process are disclosed as well.

The invention is illustrated with the following examples.

EXAMPLES

Chemicals Used:
Jeffamine M600: a mono-functional polyoxyethylene polyoxypropylene primary amine obtainable from Huntsman having a molecular weight of about 560 g/mol, and an oxypropylene/oxyethylene ratio of about 9/1. In these examples referred to as M-600
Suprasec S2020: an uretonimine modified polyisocyanate ex Huntsman having an average —NCO value of 29.5%, in these examples indicated as S2020
Suprasec S2185: a polymeric isocyanate ex Huntsman with an average —NCO value of 30.7%, in these examples referred to as S2185
Suprasec 1306: Pure 4,4'-MDI ex Huntsman, herein referred to as S1306
Suprasec S3030: Blend of 2,4' and 4,4' MDI ex Huntsman indicated at S3030
Alcupol R1610 ex Repsol, herein indicated as R1610: a glycerol initiated polyoxypropylene polyol with an —OH value of 160 mg KOH/g
Daltocel F526 is a polyester triol ex Huntsman, herein referred to as F526, having an —OH value of 127 mg KOH/g
Araldite GY-240: a bisphenol A resin ex Huntsman with an epoxy equivalent of approximately 180
Dabco K2097 ex Air Products: a solution of potassium acetate at 30 wt % in diethylene glycol
Carbamide urea at 99% ex Acros Organics
Propionamide 97% ex Aldrich
Butyraldehyde 99% ex Sigma Aldrich
Hexanal 99% ex Sigma Aldrich
Benzaldehyde analytical standard ex Fluka In the examples below, the "aldehyde composition" refers to a composition comprising polyisocyanates and one or more aldehyde compounds according to the invention and compounds selected from compounds which comprise a carboxamide group having the structure —CO—$NH_2$ according to the invention.

Preparation of Modified Isocyanate Compositions

Example 1

0.8 g of propionamide (10.88 mmol) were added to 31.2 g of S2185 (0.227 eq.) and let to react at 80° C. under stirring and nitrogen atmosphere for 2 h in a closed container. A clear and homogeneous solution of moderate viscosity was obtained.

976.28 g of S2020 (6.86 eq.) were then added to the above prepared solution previously cooled down to room temperature, before mixing the resulting mixture for a few minutes until complete homogenization.

Example 2

34.8 g of S1306 (0.278 eq.) and 25.2 g of S3030 (0.202 eq.) pre-heated to 50° C. to melt them, were mixed with 8 g of S2020 (0.056 eq.) and 12 g of S2185 (0.088 eq.). The resulting blend was then heated to 60° C., and stirred in a closed container under nitrogen atmosphere until complete homogenization.

To the above mixture of isocyanate kept at 60° C., 20 g of a solution of 5% (w/w) urea carbamide (0.033 eq.) in Daltocel F526 kept at 60° C., were added dropwise and under stirring. The resulting blend was let to react under stirring and nitrogen atmosphere for 2 h at 60° C., to give a clear, fluid and homogeneous isocyanate composition modified by an acyl urea.

Then, in another container, the above prepared isocyanate composition modified by an acyl urea was further diluted at 50° C. with 149.43 g of S1306 (1.199 eq.), 108.5 g of S3030 (0.868 eq.), 2672.79 g of S2020 (18.77 eq.) and 51.67 g (0.378 eq.) of S2185. This isocyanate composition was mixed at 50° C. under nitrogen atmosphere for about 15 minutes, until complete homogenization.

Example 3

In a glass flask, 80 g of Suprasec 2185 (0.585 eq.) were pre-heated to 60° C. under nitrogen atmosphere. To it, 20 g of a solution of 5% (w/w) urea carbamide (0.033 eq.) in Daltocel F526 as well pre-heated to 60° C., were added dropwise under stirring. After completion of the addition, the resulting blend was let to further react for 30 minutes at 80° C., under stirring and nitrogen atmosphere, to give a homogeneous isocyanate composition modified by an acyl urea.

Then, in another container, 195.26 g of Suprasec 2020 (1.371 eq.) pre-heated to 60° C., were mixed with 6.36 g of the above prepared isocyanate composition modified by an acyl urea (2.12 meq.) kept at 60° C. After a few minutes of stirring, and subsequent cooling down to room temperature, the clear, fluid and homogeneous isocyanate composition 3 was obtained.

Example 4

200 g of Suprasec S2020 (1.405 eq.) were mixed at room temperature with 0.75 g of a solution at 5% (w/w) of urea carbamide (1.25 meq.) in Daltocel F526. After a few minutes of stirring, a clear, fluid and homogeneous blend was obtained.

Example 5

200 g of Suprasec S2020 (1.405 eq.) were mixed at room temperature with 0.75 g of a solution at 10% (w/w) of propionamide (1.03 meq.) in Alcupol R1610, kept at 45° C. before addition. After a few minutes of stirring, a clear, fluid and homogeneous blend was obtained.

Example 6

1123.7 g Jeffamine M600, which was kept at 50° C., and 260 g of S1306, which were also kept at 50° C., were mixed and allowed to react for 1 hour at 80° C. under stirring, so as to form a urea compound.

23.9 g of lithium chloride were dissolved in 125.3 g ethanol while stirring.

This lithium chloride solution was added to the above prepared urea compound which was still kept at 80° C. Stirring was continued for about 15 minutes. A substantial amount of ethanol was afterwards stripped off by distillation at 85-95° C., to give an urea compound with lithium chloride dissolved in it.

Then, in a container of appropriate volume, 285 g (2.00 eq.) of Suprasec 2020 were pre-heated to 60° C. (under nitrogen atmosphere), before adding 15 g of the previously prepared urea compound with lithium chloride dissolved in it, as well pre-heated to 60° C. After a few minutes of stirring, and subsequent cooling down to room temperature, a clear, fluid and homogeneous blend was obtained.

This isocyanate composition was finally mixed at room temperature with 5.46 g of a solution of 10% (w/w) of propionamide (7.47 meq.) in Alcupol R1610 kept until then at 45° C. to avoid crystallization. After mixing the blend for a few minutes, the clear, fluid and homogeneous modified isocyanate composition of example 6 was obtained.

Example 7

In a container of appropriate volume, 95 g of Suprasec 2020 (0.667 eq.) were mixed at room temperature with 5 g of Suprasec 2185 modified by 2.5% (w/w) propionamide (1.71 meq.) previously prepared according to the same procedure as for example 1. After a few minutes of stirring, a clear, fluid, and homogeneous blend was obtained.

To this blend, 5 g of the same urea compound with lithium chloride dissolved in it (kept at 60° C.) as for example 6 were added, to give the isocyanate composition 7.

Examples 8 to 18

Preparation of Aldehyde Compositions According to the Present Invention

Aldehyde compositions were obtained by mixing for a few minutes at room temperature, the isocyanate compositions of examples 1 to 7 with different aldehydes, in amounts summarized in table 1. The number of mequivalents (meq.) and the nature of the inhibitor, and the equivalent ratio aldehyde/inhibitor are also given in this table.

TABLE 1

| Aldehyde compositions | Isocyanate composition/ amount (in g) | Aldehyde type/amount (in g) | Inhibitor type/amount (in meq.) | Ratio (aldehyde/ inhibitor) |
|---|---|---|---|---|
| 8 | 1/201.6 | Benzaldehyde/8.5 | —(C=O)—NH—(C=O) derivative/2.18 | 36.8 |
| 9 | 1/201.6 | Benzaldehyde/2.0 | —(C=O)—NH—(C=O) derivative/2.18 | 8.7 |
| 10 | 1/201.6 | Hexanal/8.0 | —(C=O)—NH—(C=O) derivative/2.18 | 36.8 |
| 11 | 2/201.6 | Hexanal/8.0 | Acyl urea/2.18 | 36.7 |
| 12 | 1/201.6 | Butyraldehyde/5.8 | —(C=O)—NH—(C=O) derivative/2.18 | 36.8 |
| 13 | 1/201.6 | Butyraldehyde/11.5 | —(C=O)—NH—(C=O) derivative/2.18 | 73.6 |
| 14 | 3/201.6 | Hexanal/8.01 | Acyl urea/2.12 | 37.7 |
| 15 | 4/200.8 | Hexanal/9.0 | Urea carbamide/1.25 | 71.9 |
| 16 | 5/200.8 | Hexanal/4.0 | Propionamide/1.03 | 38.9 |
| 17 | 6/101.8 | Hexanal/8.0 | Propionamide/2.50 | 32.1 |
| 18 | 7/105.0 | Hexanal/8.0 | —(C=O)—NH—(C=O) derivative/1.71 | 46.8 |

Example 19 to 29

Preparation of Curable Compositions and Polyisocyanurate Materials According to the Present Invention To the previously prepared aldehyde compositions 8 to 14, 15 g of a polyol solution made by mixing at room temperature 7.6 g of Dabco K2097 (23.23 mmol of K-acetate) with 242.4 g of Alcupol R1610, were progressively added while keeping the reactive mixture under stirring. After mixing, clear, homogeneous and relatively fluid curable compositions 19 to 25 were obtained.

To 209.75 g of the aldehyde composition 15 kept under stirring at room temperature, 15 g of a solution at 2% (w/w) Dabco K2097 (0.93 meq.) in Alcupol R1610 were added dropwise with a Pasteur pipette. After complete addition, only a weak exotherm was noticed in the resulting clear and homogeneous curable composition 26.

To 204.75 g of the aldehyde composition 16 kept under stirring at room temperature, 15 g of a solution at 1.67% (w/w) Dabco K2097 (0.76 meq.) in Alcupol R1610 were added dropwise with a Pasteur pipette. After complete addition, only a weak exotherm, and some viscosity increase were noticed in the resulting clear and homogeneous curable composition 27.

109.8 of the aldehyde composition 17 were mixed at room temperature with 13.8 g of Alcupol R1610, and 2 g of Araldite GY-240. After one minute of stirring, the clear, fluid and homogeneous curable composition 28 was obtained.

113.0 of the aldehyde composition 18 were mixed at room temperature with 10 g of Alcupol R1610, and 2 g of Araldite GY-240. After one minute of stirring, the clear, fluid and homogeneous composition 29 was obtained.

The detailed compositions, and the equivalent ratios (Catalyst/inhibitor) are given in table 2.

TABLE 2

| Curable compositions | Isocyanate composition/ amount (in g) | grams of polyol/Catalyst (mmol) | Ratio (Catalyst/ inhibitor) |
|---|---|---|---|
| 19 | 8/210.1 | 15 R1610/Kacetate (1.45) | 0.667 |
| 20 | 9/203.6 | 15 R1610/Kacetate (1.45) | 0.667 |
| 21 | 10/209.6 | 15 R1610/Kacetate (1.45) | 0.667 |
| 22 | 11/209.6 | 15 R1610/Kacetate (1.45) | 0.667 |
| 23 | 12/207.4 | 15 R1610/Kacetate (1.45) | 0.667 |
| 24 | 13/213.2 | 15 R1610/Kacetate (1.45) | 0.667 |
| 25 | 14/209.6 | 15 R1610/Kacetate (1.45) | 0.658 |
| 26 | 15/209.8 | 15 R1610/Kacetate (0.93) | 0.745 |
| 27 | 16/204.8 | 15 R1610/Kacetate (0.76) | 0.745 |
| 28 | 17/109.8 | 13.8 R1610/(LiCl/epoxy) (0.002) | 0.803 |
| 29 | 18/113.0 | 10 R1610/(LiCl/epoxy) (0.002) | 1.169 |

All the curable compositions of table 2 were characterized with a Q2000 differential scanning calorimeter (DSC) from TA instruments less than 10 minutes after preparation. Such samples were submitted to a 5° C./min heating ramp from about room temperature to 230° C.

Figure 1:
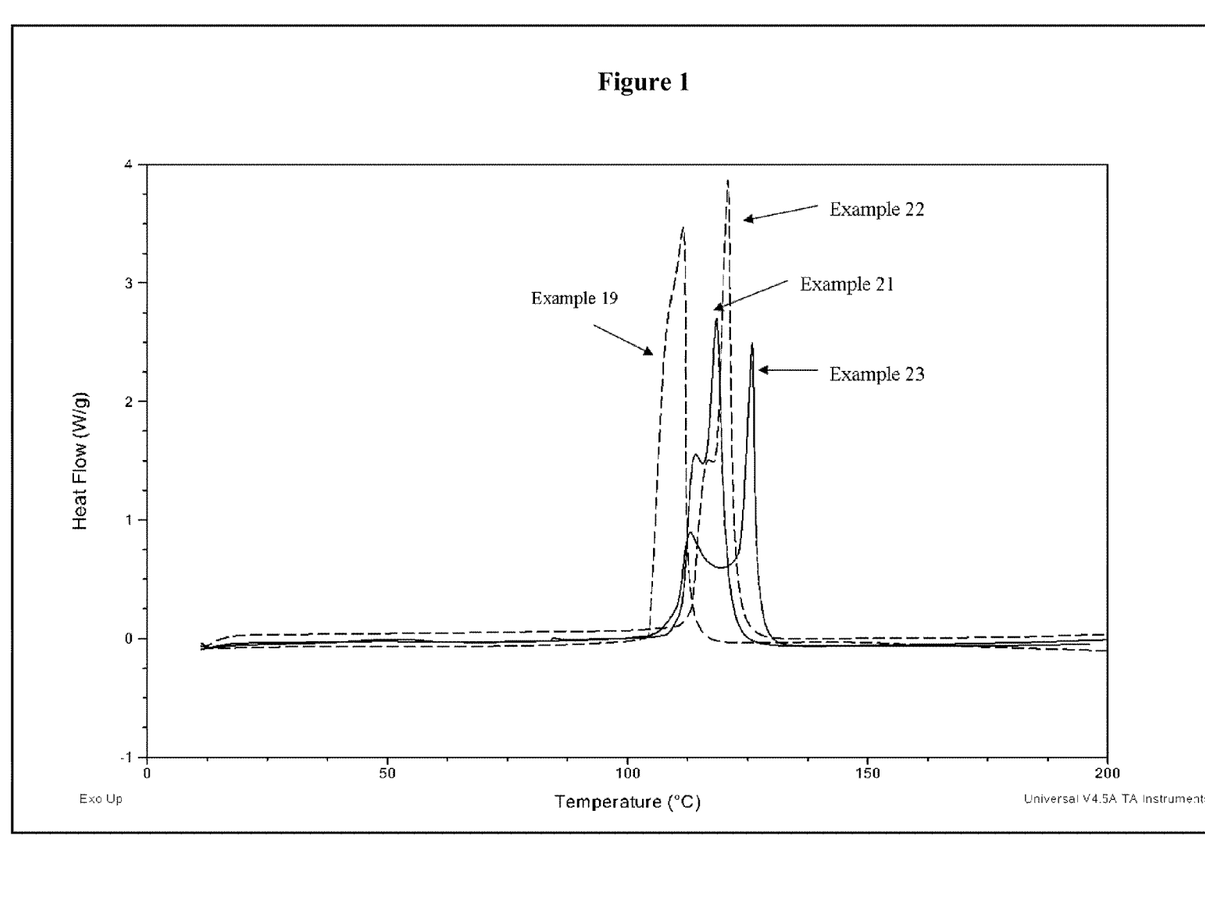
FIG. 1. is a thermograph showing heat flow vs. temperature for Examples 19, 21, 22, and 23.
Figure 2:
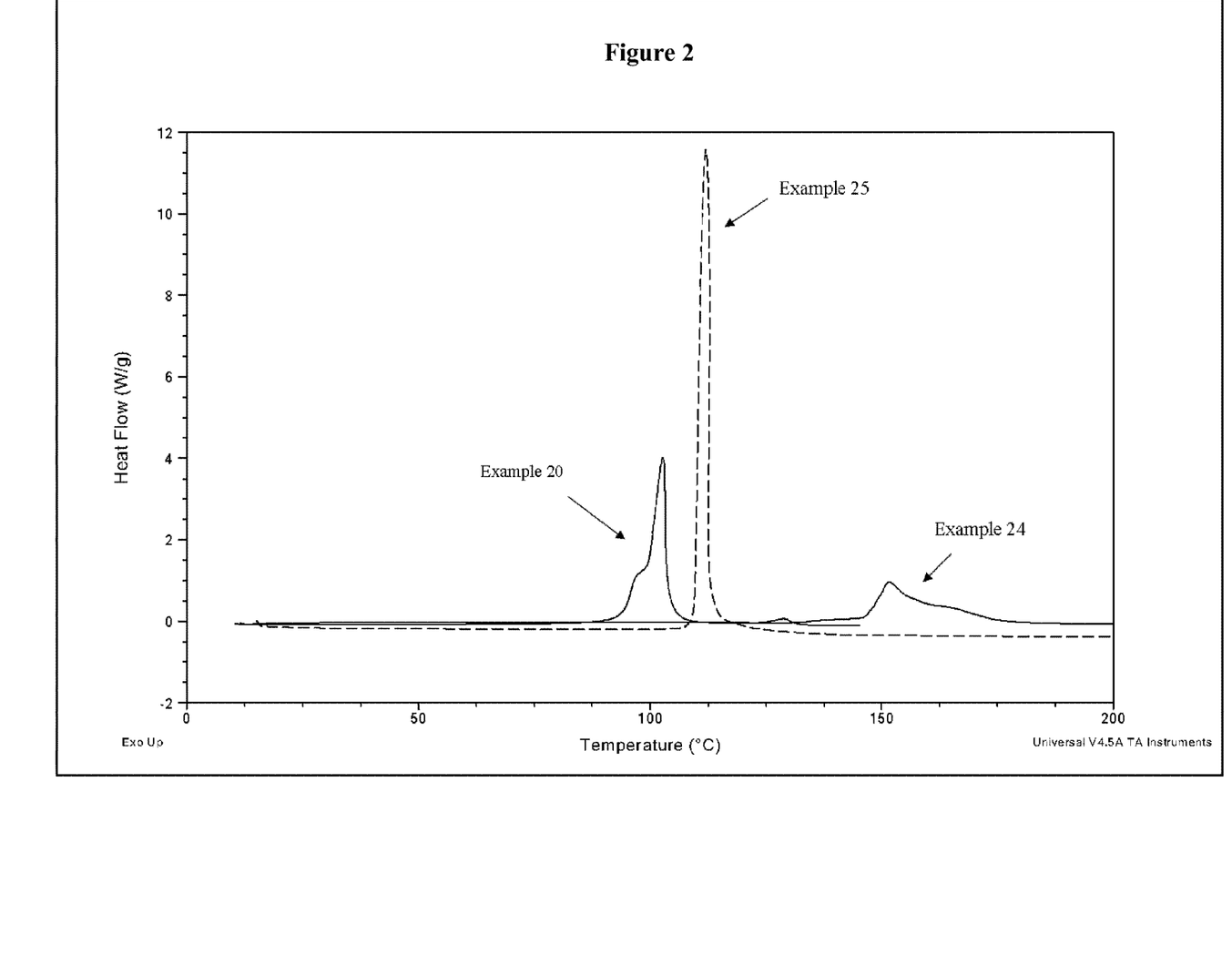
FIG. 2 is a thermograph showing heat flow vs. temperature for Examples 20, 24, and 25.
Figure 3:
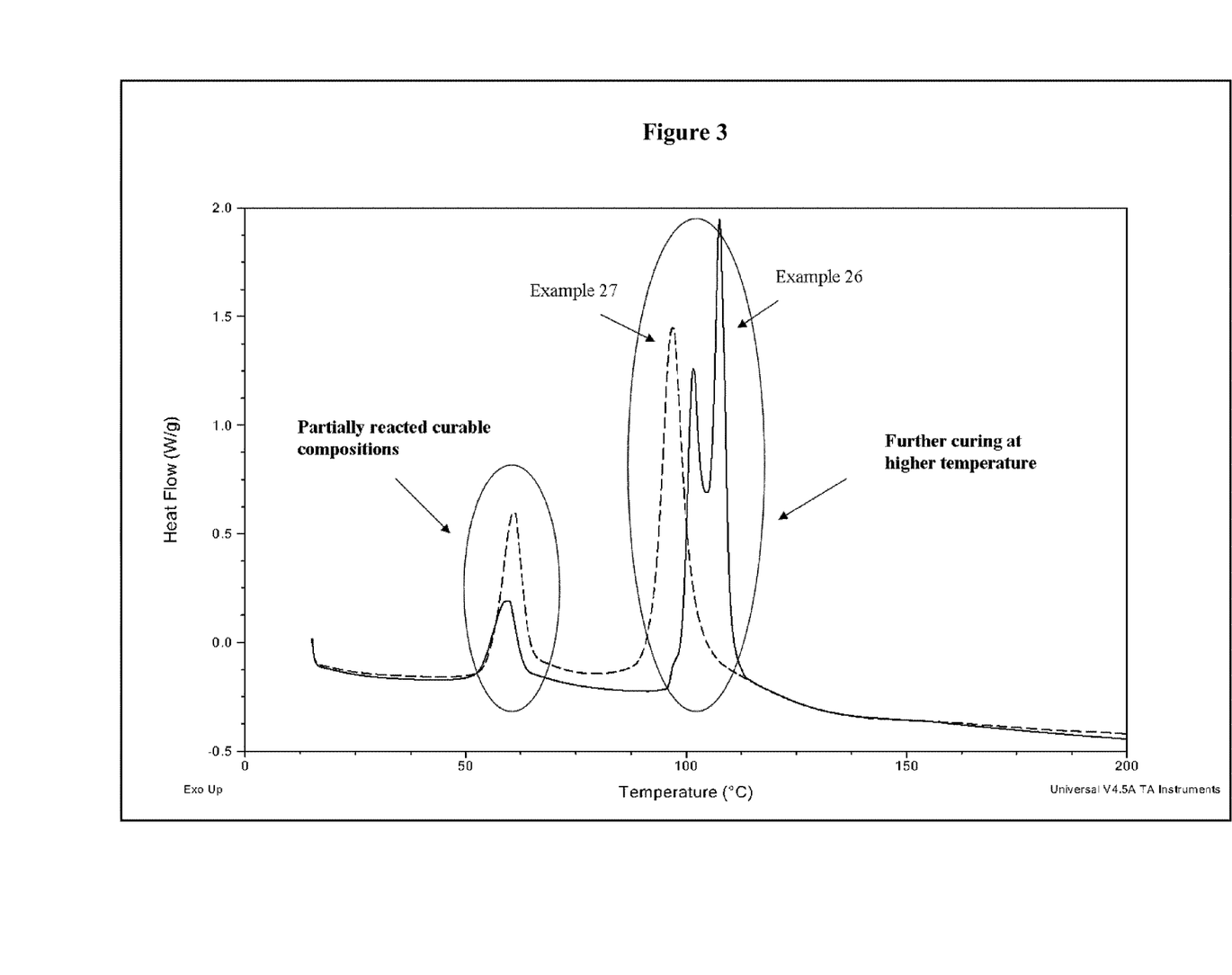
FIG. 3 is a thermograph showing heat flow vs. temperature for Examples 26 and 27.
Figure 4:
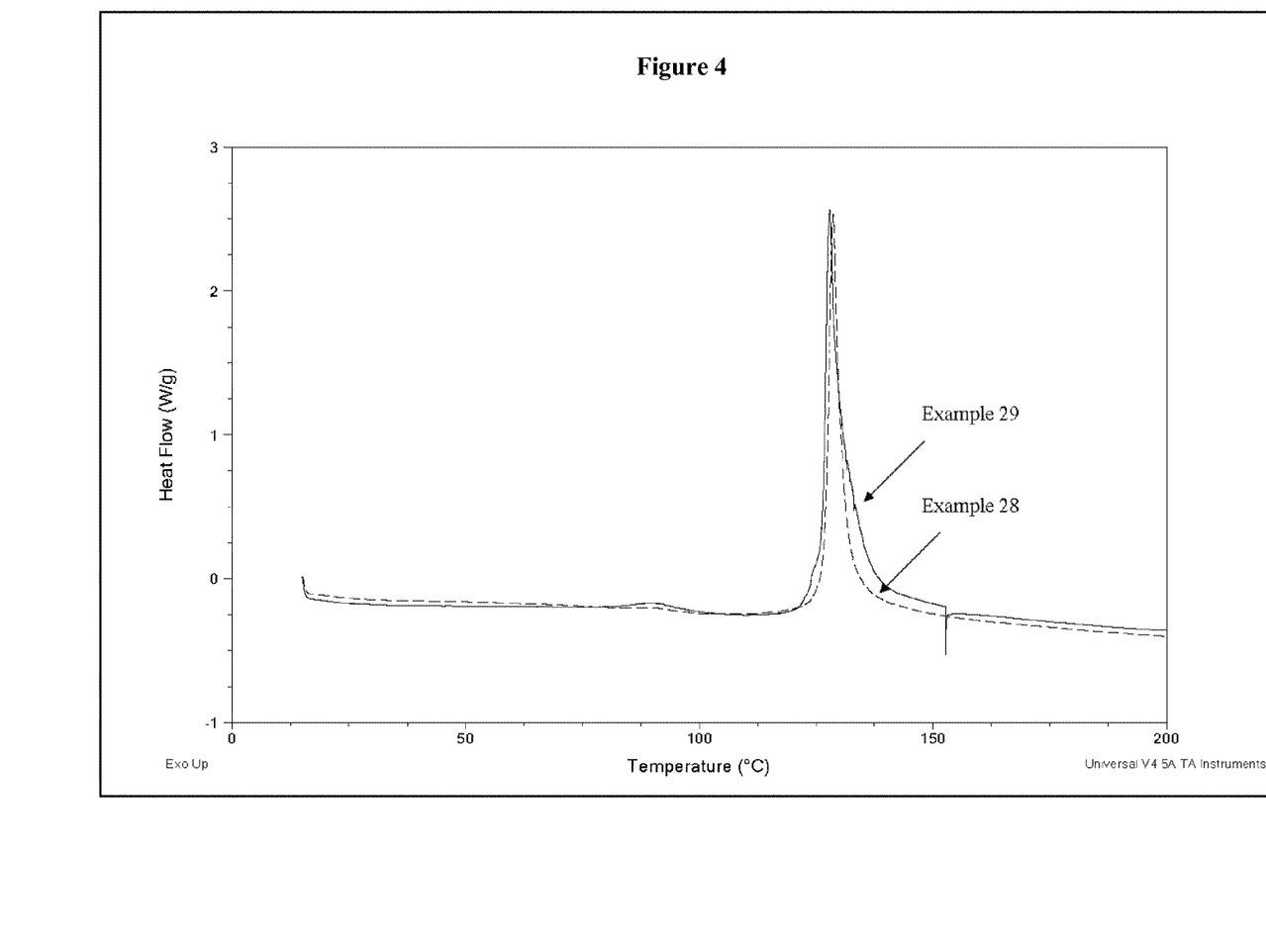
FIG. 4 is a thermograph showing heat flow vs temperature for Examples 28 and 29.

A clear exothermic reaction attributed to the curing of these polyurethane/polyisocyanurate resins can be observed on all the thermograms of FIGS. 1 to 4.

In the specific case of examples 26 and 27 (FIG. 3), a first weaker peak at about 55° C. corresponds to the partial reaction of the corresponding curable compositions. These are only further cured at higher temperature, namely above 100° C.

The pot-life of the curable compositions of this patent were roughly estimated by visual observation (time interval during which the resin stays liquid and fluid enough to be easily processed), on 100 g samples kept at room temperature in closed glass bottles.

All curable compositions had at least a 2 day pot-life at room temperature, except for number 26 which flowed easily for approximately 5 hours at room temperature.

The invention claimed is:

1. A process for making a polyisocyanurate material, said process comprising at least the steps of:
   (a) forming an polysisocyanate composition by combining and mixing one or more polyisocyanates, one or more compounds selected from compounds which comprise a carboxamide group having the structure —CO—NH$_2$ and from compounds which comprise a group having the structure —CO—NH—CO—, and one or more trimerization catalyst compounds wherein the compounds which comprise the carboxamide group inhibit the catalytic effect of the trimerization catalyst compounds;
   (b) adding one or more aldehyde compounds to the polyisocyanate composition of step (a) wherein the aldehyde compounds reactivate the catalytic effect of the trimerization catalyst; and wherein the number of equivalents of compounds having a —CO—NH—CO- group in the curable polyisocyanate composition is smaller or equal than the number of aldehyde equivalents;
   (c) forming an intermediate and further curable polyisocyanurate material by allowing the polyisocyanate composition formed in step (b) to react at an elevated temperature, wherein the elevated temperature is greater than room temperature but below 90° C.;
   (d) cooling the intermediate polyisocyanurate material formed in step (c) back to room temperature; and
   (e) heating the intermediate polyisocyanurate material after step (d) to above 90° C. to cure the intermediate polyisocyanurate material thereby forming the polyisocyanruate material.

2. The process for making the polyisocyanurate material according to claim 1, wherein the number of equivalents of compounds comprising a carboxamide group having the structure —CO—NH$_2$ is at least 4 times higher than the number of catalyst compound equivalents and the final concentration of the compound comprising a —CO—NH—CO—group in the curable polyisocyanate composition is such that the ratio of —CO—NH—CO—groups to the number of isocyanate groups is at most 1.

3. The process for making the polyisocyanurate material according to claim 1, adding an additive to the intermediate polyisocyanurate material after step (b) but before step (d), wherein said additive comprises wood chips, wood dust, wood flakes, wooden plates; paper and cardboard; sand, vermiculite, clay, cement and other silicates; ground rubber, ground thermoplastics, ground thermoset materials; honeycombs of any material; metal particles and plates; cork; natural fibers; synthetic fibers; mineral fibers; mineral fillers; nanoparticles; glass beads, ground glass, hollow glass beads; expanded or expandable beads; untreated or treated waste; woven and non-woven textiles; and combinations thereof.

4. The process for making the polyisocyanurate material according to claim 1, wherein the polyisocyanruate material is heated for at least a few minutes and up to 2 hours.

5. The process for making the polyisocyanurate material according to claim 1, wherein before step (d) adding additional trimerization catalyst to the intermediate polyisocyanurate material.

6. The process for making the polyisocyanurate material according to claim 1, wherein the intermediate polyisocyanurate material has an NCO value ranging from 5-30% by weight and has a final concentration of polyisocyanurate compounds which does not change more than 10% from its initial value (calculated as a change in NCO value) when kept at room temperature and ambient pressure for a time period that is greater or equal than 5 hours.

* * * * *